United States Patent
Hansen et al.

(10) Patent No.: US 6,971,316 B2
(45) Date of Patent: Dec. 6, 2005

(54) RESTRAINT

(76) Inventors: Ned R. Hansen, 780 E. 300 North, Hyde Park, UT (US) 84318; Quin R. Checketts, 672 E. Center St., Providence, UT (US) 84332; S. Rhodes Wilkinson, 795 W. 150 North, Hyrum, UT (US) 84319

( * ) Notice: Subject to any disclaimer, the term of this patent is extended or adjusted under 35 U.S.C. 154(b) by 180 days.

(21) Appl. No.: 10/244,798

(22) Filed: Sep. 16, 2002

(65) Prior Publication Data

US 2004/0049897 A1    Mar. 18, 2004

(51) Int. Cl.[7] .............................................. A63G 1/00
(52) U.S. Cl. ............................ 104/53; 108/55; 108/61; 108/63; 297/488
(58) Field of Search .............................. 297/464, 486, 297/487, 488; 104/53, 61; 180/271, 268; 280/748, 751, 753

(56) References Cited

U.S. PATENT DOCUMENTS

| | | | |
|---|---|---|---|
| 2,801,866 A | | 8/1957 | Naslund |
| 3,393,010 A | | 7/1968 | Steinberg |
| 3,941,060 A | * | 3/1976 | Morsbach .................... 104/247 |
| 4,230,366 A | * | 10/1980 | Ruda ......................... 297/487 |
| 4,388,980 A | * | 6/1983 | Vig et al. .................... 180/271 |
| 4,397,371 A | * | 8/1983 | Lynnes et al. ............... 180/271 |
| 4,531,459 A | | 7/1985 | Yamada |
| 4,770,468 A | * | 9/1988 | Shubin ....................... 297/487 |
| 4,858,997 A | * | 8/1989 | Shubin ....................... 297/487 |
| 4,955,452 A | * | 9/1990 | Simonz ....................... 180/271 |
| 4,984,845 A | * | 1/1991 | Knoedler et al. ......... 297/256.15 |
| 5,050,700 A | * | 9/1991 | Kim .......................... 180/268 |
| 5,100,173 A | * | 3/1992 | Kudler ....................... 280/748 |
| 5,129,478 A | * | 7/1992 | Suenaga et al. ............ 180/268 |
| 5,433,153 A | * | 7/1995 | Yamada ....................... 104/63 |
| 5,454,596 A | * | 10/1995 | Dirck ........................ 280/748 |
| 6,213,558 B1 | * | 4/2001 | Axelson et al. ............. 297/464 |
| 6,299,207 B1 | * | 10/2001 | Bares ........................ 280/748 |
| 6,394,492 B1 | * | 5/2002 | Corbett ...................... 280/751 |
| 6,732,829 B2 | * | 5/2004 | Bares ........................ 180/271 |

FOREIGN PATENT DOCUMENTS

EP    0 600 300 A2    6/1994

* cited by examiner

Primary Examiner—Peter M. Cuomo
Assistant Examiner—Erika Garrett
(74) Attorney, Agent, or Firm—Fehr Law Firm; Thompson E. Fehr

(57) ABSTRACT

A restraint for retaining a person within a seat. The restraint has a lap bar and a shoulder bar which can be independently adjusted. The lap bar can be rotated either to retain a person or to permit a person to enter or exit. Also, the lap bar can be pulled farther away or pushed closer to a person. When extended completely, the lap bar will remain locked in such position until the lap bar is rotated toward the position a person will occupy. When pushed toward a person, the lap bar cannot be pushed farther away until a rod to which the lap bar is attached is released from a lock. The shoulder retainer is attached to a similar rod which is locked in this same fashion.

25 Claims, 10 Drawing Sheets

RESTRAINT

BACKGROUND OF THE INVENTION

1. Field of the Invention

This invention relates to a restraint for retaining a person within a seat.

2. Description of the Related Art

The Inventor is aware of no other rigid restraint employing a rod lock as described in this invention for the lap of a person within a seat and is also aware of no rigid restraint which can be adapted both to the height and lap size of a participant.

A hydraulic lock such as the one discussed below was employed on amusement rides by S & S Sports Power, Inc. of Logan, Utah, that was available to the public on or shortly after Oct. 18, 1994.

A locking apparatus similar to the one considered below was employed on amusement rides by S & S Sports Power, Inc. of Logan, Utah, on or shortly after Aug. 4, 2001, and is the subject of copending U.S. application Ser. No. 09/922,588, filed on Aug. 3, 2001.

SUMMARY OF THE INVENTION

In its most basic form, the Restraint of the present invention is a lap retainer which includes a lap bar attached to a second end of a rod at such an angle that the lap bar can retain a person in a seat to which a rod lock for the rod has been attached.

The rod lock precludes longitudinal motion of the rod either continuously or discretely along a portion of the rod A preferred rod lock is the locking apparatus of the present invention that utilizes a rod wherein the diameter of the rod varies periodical as one moves along the rod from a first end; it is, thus, termed a serrated rod. The locking apparatus also includes a block having an aperture. The maximum thickness of the rod is less than the minimum diameter of the aperture in the block so that the rod can be inserted into the aperture.

Between the center of the aperture and a first end of the block, the block is rotatably attached to a support structure, and the second end of the block is biased toward the direction from which the rod is intended to be inserted. The biasing of the block reduces the minimum diameter of the aperture as projected perpendicular to the longitudinal axis of the rod. The projected minimum diameter of the aperture is then less than the periodic maximum diameter of the rod so that pushing the rod into the aperture tends to decrease the biasing, thereby increasing the minimum projected diameter of the aperture, until the minimum projected diameter of the aperture exceeds the periodic maximum diameter of the rod so that the rod can enter the aperture. Continuing to push the rod enables it to proceed farther into the aperture. As the rod is pushed farther into the aperture, however, the biasing pushes the edge of the aperture into a portion of the rod between periodic maximum diameters. Then attempting to withdraw the rod causes the rod to pull the block and thereby either maintain or increase the biasing, which consequently reduces the projected diameter of the aperture and precludes withdrawal of the rod.

When it is desired to release the rod, any means well known in the art for applying a physical force is used to push against or pull the block to reduce the biasing. The preferred means is, however, a sheathed cable with the sheath attached to the support structure for the block and the cable attached to the block or to a lever that presses against the block.

Preferably, but not necessarily, a sensor detects whether the rod has been inserted into the aperture.

Also, the locking apparatus preferably has two blocks. The first block and second block are located at such a distance from one another that the aperture in one block will be at a point of minimum thickness of the rod while the other block is at a point of maximum thickness of the rod.

Other non-exclusive examples of acceptable rod locks are are any type of ratchet lock that is well known in the art and a hydraulic lock Preferably, the Restraint also includes a shoulder retainer having a shoulder bar that is connected to a second rod which fits into a rod lock similar to that for the lap belt. The support structure for the shoulder retainer is attached to the seat in such a position and with such an orientation that the second rod permits the should bar to be changed from position to position to accommodate persons of different heights.

Preferably, the lap bar is rotatable but can be locked into position to retain a person in a seat.

BRIEF DESCRIPTION OF THE DRAWINGS

FIG. 7 depicts the preferred embodiment of the lap retainer with the lap retainer rotated ninety degrees around the longitudinal axis of the rod with respect to the view of FIG. 5a.

DESCRIPTION OF THE PREFERRED EMBODIMENT

Figure 1:
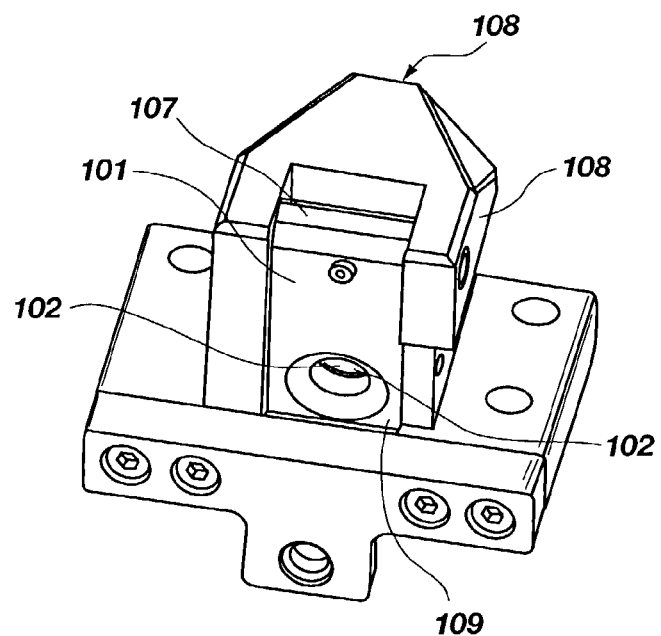
FIG. 1 provides a normal view of the locking apparatus.
Figure 2:
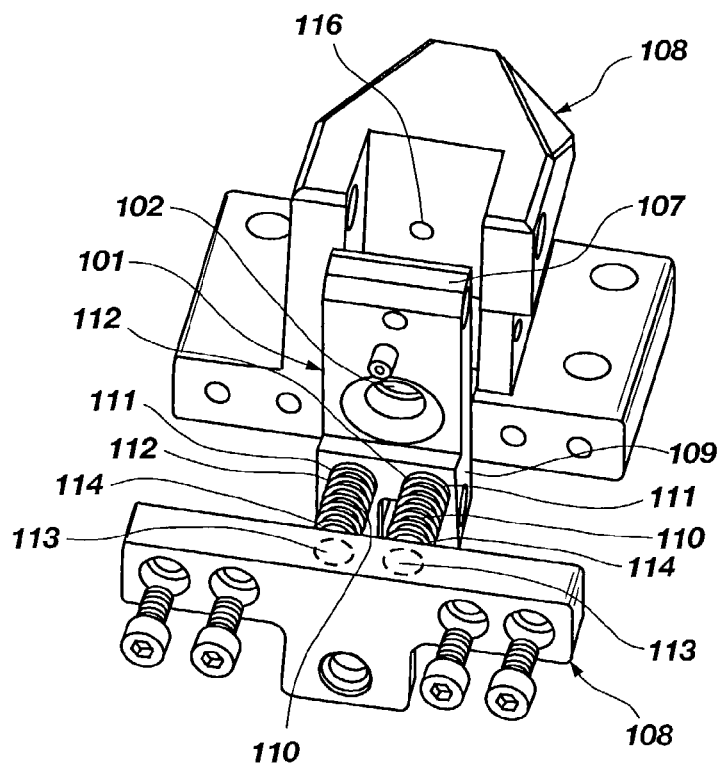
FIG. 2 is an exploded view of the locking apparatus.
Figure 3:
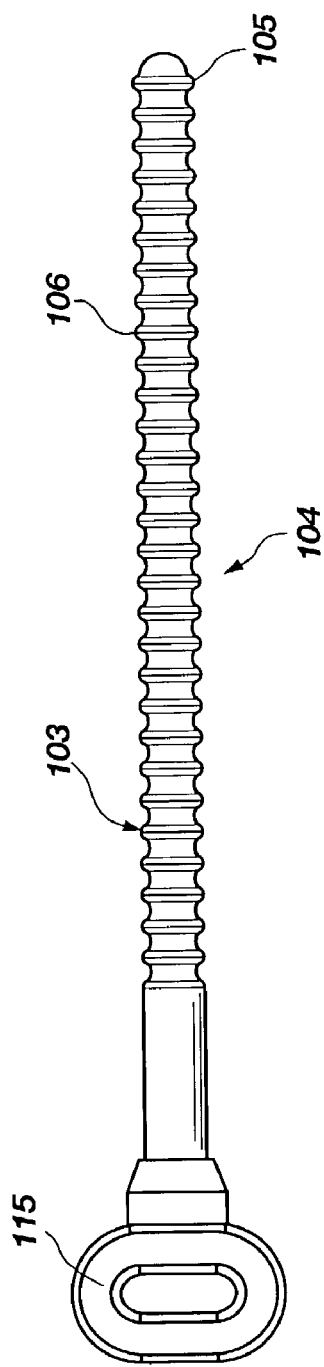
FIG. 3 shows a rod having its second end in the shape of a loop.
Figure 4:
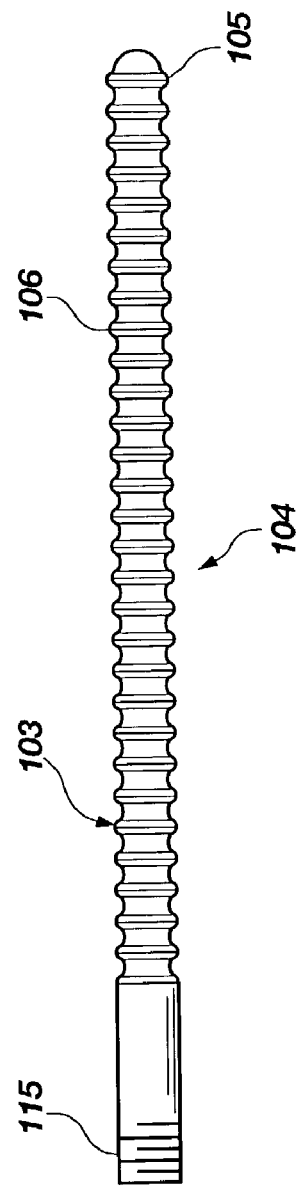
FIG. 4 illustrates a rod having screw threads on its second end.

A key feature of the present Restraint is termed a rod lock 1. The rod lock 1 precludes longitudinal motion of a rod 103 either continuously or discretely along a portion of the rod 103.

A preferred version of the rod lock 1 is termed the "locking apparatus."

The locking apparatus has a block 101 containing an aperture 102.

A rod 103 is removably insertable into the aperture 102. The rod 103 employed with the locking apparatus is serrated, i.e., the thickness of the rod 103 varies periodically along a portion 104 of the length of the rod 103 beginning near a first end 105 of the rod 103.

The maximum periodic thickness 106 of the rod 103 is less than the minimum diameter of the aperture 102 in the block 101 so that the rod 101 can be inserted into the aperture 102.

Between the center of the aperture 102 and a first end 107 of the block 101, the block is rotatably attached to a support structure 108. The block 101 is biased so that the second end 109 of the block 101 is farther toward the direction from which the rod 103 is intended to be inserted that is the first end 107 of the block 101. Preferably, but not necessarily, such biasing is done between the center of the aperture 102 and a second end 109 of the block 101.

Biasing may be accomplished by any device 110, such as a spring that will exert a physical force between the block 101 and the support structure 108. Preferably, but not necessarily, the block 101 contains a first depression 111 to hold a first end 112 of the device 110; and preferably, but not necessarily, the support structure 108 contains a second depression 113 to hold a second end 114 of the device 110.

The second end 115 of the rod 103 is available for connection to a restraining device such as the cloth of a seat belt or a bar and is shaped to accommodate such restraining device. This shape is generally a loop for a seat belt or screw threads for insertion into a bar.

Operation of the locking apparatus was discussed above. From that discussion it will be apparent that the further the rod 103 is pushed into the block 101, the tighter the restrain will be.

And, as also considered above, any means well known in the art for applying a physical force is used to push against or pull the block 101 to reduce the biasing. Such a means may, e.g., be a manually operated rod or lever, a cable attached to the block 101 to pull the block 101, a motor, a hydraulically powered rod to push the block 101, or a pneumatically powered rod to push the block 101.

Optionally and preferably, a sensor 116 of any type known in the art for indicating the presence of the rod 103 within the block may be utilized. This could, for example, be a contact sensor or a light sensor.

And, as noted above and illustrated in FIG. 5, preferably two blocks 101 are rotatably attached to the support structure 108 and are located at such a distance from one another that the aperture 102 in one block 101 will be at one of the points of minimum thickness in the varying cycle of thickness of the rod 103 when the aperture 102 in the other block 101 is at one of the points of maximum thickness of the rod 103.

The Restraint of the present invention can consist solely of a lap retainer 201.

The lap retainer 201 has a first end 202 of a lap bar 203 attached to the second end 115 of the rod 103 at such an angle that the lap bar can retain a person in a seat to which a support structure 108 of the locking apparatus has been attached. Pushing the lap bar 203 generally toward the support structure 108 forces the rod 103 farther into the aperture 102 of the block or blocks 101, thereby securing a person in a seat to which the lap retainer 201 has been attached.

Figure 6:
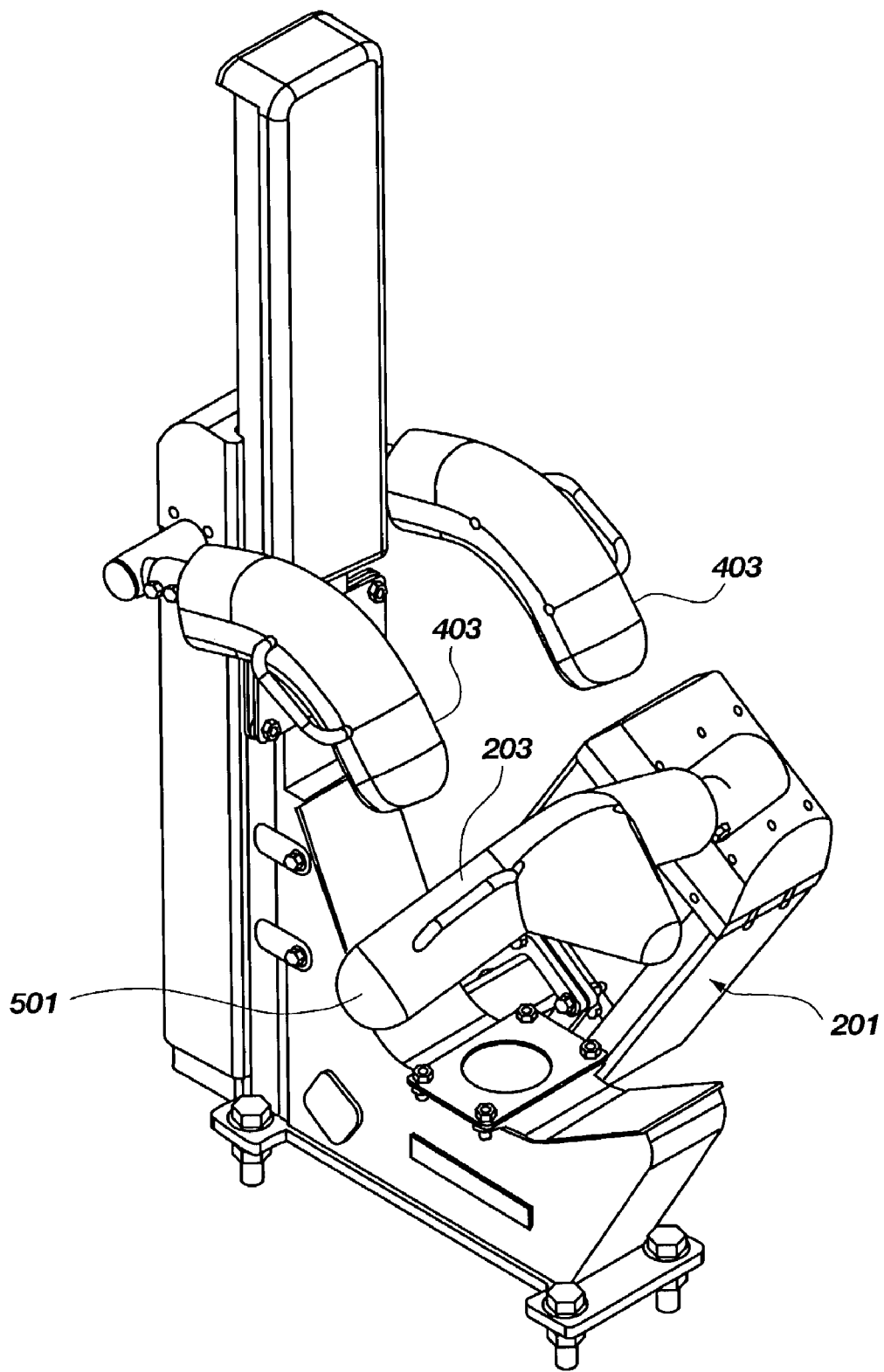
FIG. 6 is an isometric view of the Restraint attached to the framework of a seat.

In order further to secure a person in a seat, a second end 501 of the lap bar 203 is, as illustrated in FIG. 6, preferably angled so that such second end 501 is generally parallel to the rod 103.

Figure 5A:
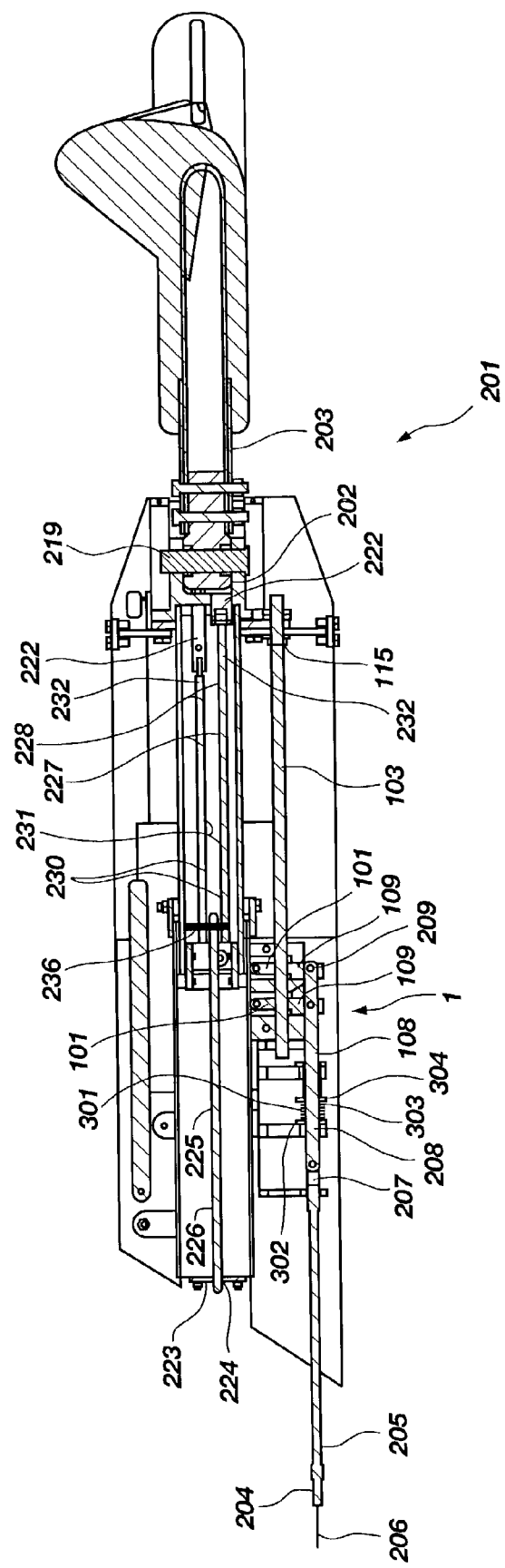
FIG. 5 is a lateral view of the preferred embodiment of the lap retainer with the figure subdivided into FIG. 5a having the sleeves cut away to illustrate the telescoping release rod, FIG. 5b to portray the gas cylinder, and FIG. 5c to depict the device to hold the lap retainer at its most extended position.
Figure 5B:
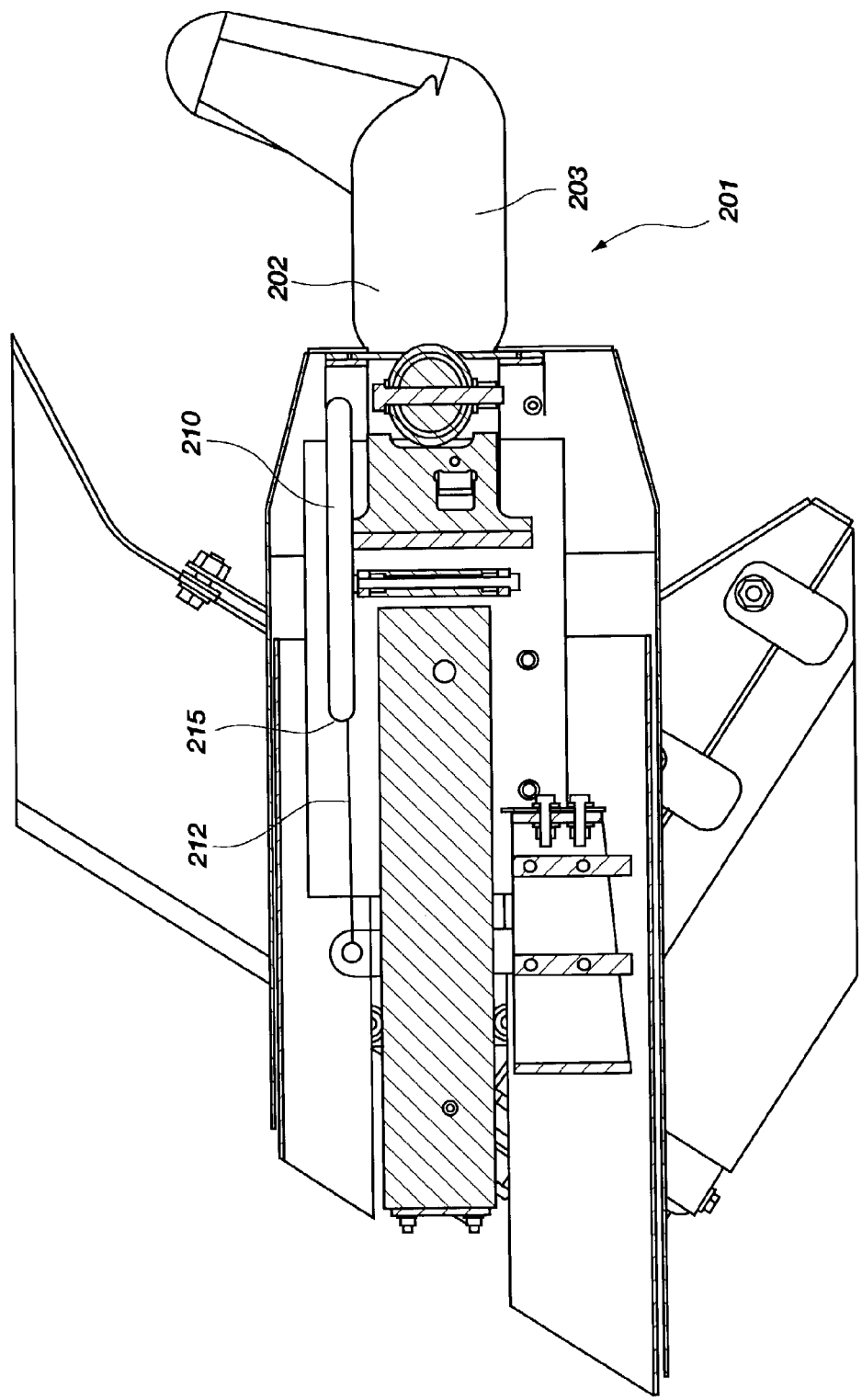
Figure 5C:
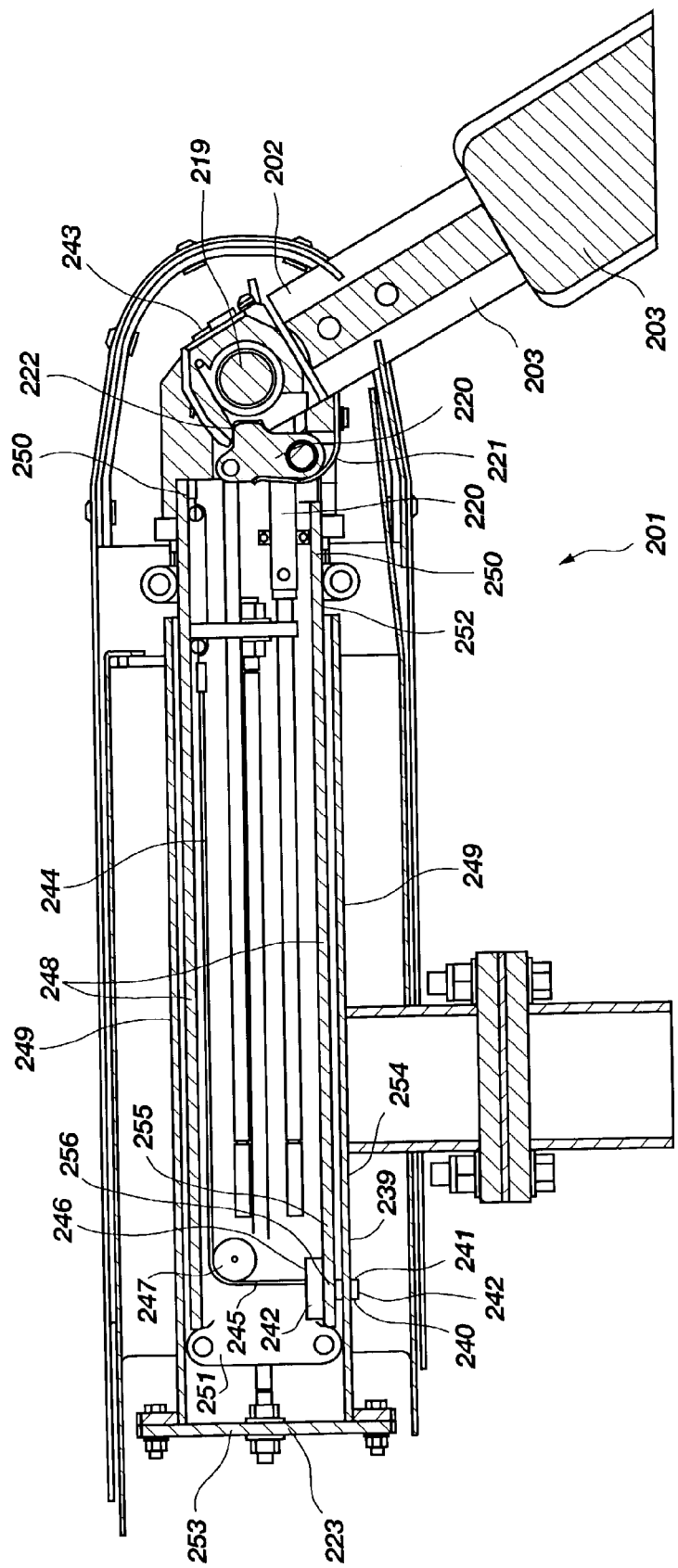

In order to release the rod 103 and permit the lap retainer 201 to be pulled farther away from the support structure 108 and, consequently, allow a person to exit from the seat, a sheathing 204 of a sheathed cable 205 is, as shown in FIG. 5, attached to the support structure 108 while the cable 206 is connected to a first end 207 of a lever arm 208 slidably mounted on the support structure 108 and connected to the block 101 or blocks 101 near the second end 109 of the block 101 or blocks 101 so that when the cable 206 pulls such lever arm 208, the biasing of the block 101 or blocks 101 is reduced, allowing the rod 103 to be removed. (Of course, the cable 206 could be connected to a second end 209 of the lever arm 208 so that when the cable 206 pushes the lever arm 208, the biasing of the block 101 or blocks 101 would be reduced.) Preferably, the connection of the lever arm 208 to the block 101 or blocks 101 is releasable; and a spring 301 or the like having a first end 302 attached to the support structure 108 and a second end 303 pushing against the lever arm 208 (which lever arm 208 has a surface 304 generally perpendicular to the length of the lever arm 208 in order to accept the pushing of the spring 301 or the like) maintains the lever arm 208 apart from the block 101 or blocks 101 until the cable 206 pulls the lever arm 208.

Optionally, the sheathed cable 205 can be replaced by a gas (preferably, air) actuator, designated herein as the "block actuator" which has a piston slidably mounted within a housing from which a rod, designated herein as the "block actuator rod," exits, with a first end of the block actuator rod being connected to the piston within the block acutator and the second end of the block actuator rod being connected to the first end 207 of the lever arm 208. The housing of the block actuator is attached to the support structure 108. Depending on which side of the piston that the gas is injected through a valve into the housing, the block actuator rod can either push or pull the lever arm 208 to reduce biasing on the block 101 or blocks 101.

Preferably, a means for exerting a force away from the support structure 108 and generally toward the first end 202 of the lap bar 203, preferably a gas cylinder 210 having a first end 211 of a cylinder rod 212 attached to a piston 213 slidably mounted within a bore 214 of the housing 215 of the gas cylinder 210 and containing pressurized gas on a side 216 of the piston 213 opposite to the side 217 on which the cylinder rod 212 is located, is also directly or indirectly connected to the support structure 108 and to the lap bar 203. In the case of the gas cylinder 210, the housing 215 is connected directly or indirectly to the support structure 108; and a second end 218 of the cylinder rod 212 is attached to the lap bar 203. Alternatively, of course, the housing 215 can be connected to the lap bar 203 with the second end 218 of the cylinder rod 212 being directly or indirectly connected to the support structure 108.

Optionally, the gas cylinder 210 can be replaced with a a gas (preferably, air) actuator, designated herein as the "extension actuator," which has a piston slidably mounted within a housing from which a rod, designated herein as the "extension actuator rod," exits, with a first end of the extension actuator rod being connected to the piston within the extension actuator and the second end of the extension actuator rod being attached to the lap bar 203. The housing for the extension actuator is attached to the support structure 108. Injecting gas through a valve into the housing on the side of the piston to which the extension actuator rod is attached will cause the lap bar 203 to be pulled closer to the support structure 108, and injecting gas through a valve into the housing on the side of the piston opposite to the side to which the extension actuator rod is attached will cause the lap bar 203 to move away from the support structure 108. (Of course, the connections of the housing and the extension actuator rod can be reversed, thereby causing the movement just described to be reversed.)

Also preferably, the lap bar 203 is rotatable (in either the yaw axis or the roll axis, but not necessarily both, with respect to the serrated rod 103) so that, in addition to being able to be pushed generally away from the support structure 108 to facilitate a person entering or leaving a seat to which the support structure 108 has been attached, the lap bar 203 can be rotated to create an even clearer path for such a person.

To make the lap bar 203 rotatable, the first end 202 of the lap bar 203 is rotatably connected to a hinge 219; and the second end 115 of the serrated rod 103 is attached to the hinge 219. In this embodiment, the means for exerting a force away from the support structure 108, preferably the second end 218 of the cylinder rod 212, is also directly or indirectly connected to the hinge 219, rather than to the lap bar 203.

Figure 7:
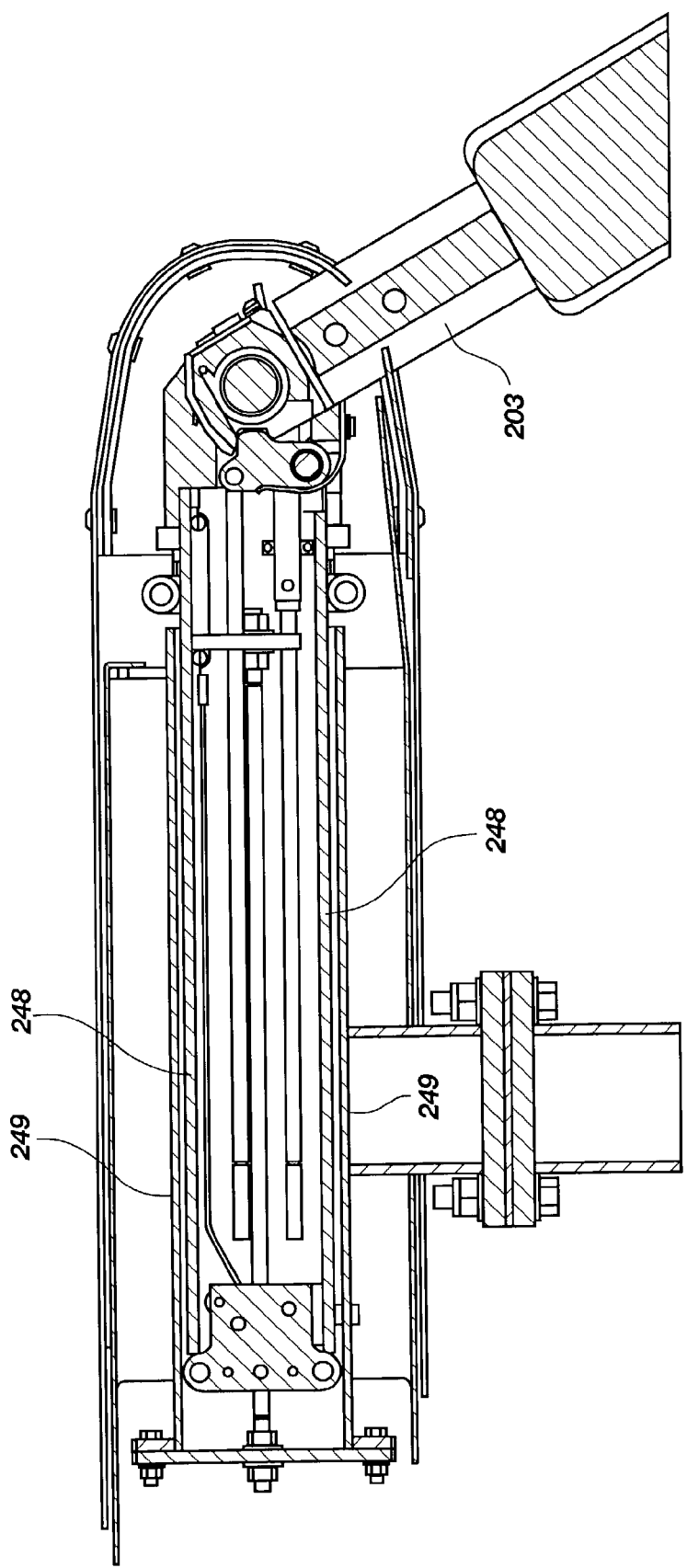

Also, as depicted in FIG. 7, when the lap bar 203 is rotatable, one or more plugs 220 are biased by one or more springs 221 or the like toward the first end 202 of the lap bar 203, which first end 202 contains a cavity 222 for each plug 220 shaped to accommodate such plug 220 and located so that each such plug 220 can enter such cavity 222 only when the lap bar 203 is at the desired angle, with respect to the serrated rod 103, to retain a person in a seat to which the support structure 108 has been attached.

Once the plugs 220 have entered the cavities 222, the plugs 220 must, of course, be removed from the cavities 222, to permit rotation of the lap bar 203. To facilitate such removal, a stop 223 having an aperture 224 is directly or indirectly connected to the support structure 108. A release rod 225 has a first segment 226 designed to pass through the aperture 224 and has a second segment 227, which second segment 227 is preferably split into as many sections 228 as there are plugs 220. The first segment 226 has an outward projection 229 preferably near a first end 230 of such first segment and necessarily on the side 231 of the stop 223 opposite to the side 232 on which the second segment 227 is located. (For purposes of this patent application, aperture 224 may be either a single aperture or multiple apertures; and release rod 225 includes both a single rod with a split second segment 227 as explained above and also a number of rods equal to the number of plugs with the first segment 226 of each rod passing through one and only one of the apertures 224 in the stop 223, with no aperture 224 containing more than a single first segment 226, and with the second segment 227 of each of such rods not being split.) Moreover, preferably, the release rod 225 is telescoping in order to limit the distance that the first end 230 of the first segment 226 of the release rod 225 must extend beyond the stop 223 on the side 231 on which the outward projection 229 is located. In fact, when the release rod 225 is telescoping, the first end 230 of the first segment 226 of the release rod 225 can simply be attached to the stop 223; then no aperture 224 is necessary in the stop 223.

A first end 232 of each second segment 227 is attached to one or more plugs 220. It is essential that each plug 220 be attached to a second segment 227. Preferably, but not necessarily, however, a given plug 220 will be connected only to one second segment 227 of a release rod 225 having a non-split second segment 227 or only to one section 228 of a release rod 225 having a split second segment 227.

A simple example and preferred technique for making the release rod 225 telescoping is as follows:

An outward projection 233 is attached to each second segment 227 near a second end 234 of each second segment 227. Similarly, an outward projection 234 is attached to each first segment 226 near a second end 235 of each first segment 226. A plate 236 has a sufficient number of apertures 237 for each first segment 226 and each second segment 227 with each aperture 237 having a diameter 238 larger than the cross-sectional width of a segment 226, 227 which passes through such aperture 237. The plate 236 is situated so that it is between the outward projections 233 of the first segment 226 or segments 226 and the outward projections 234 of the second segment 227 or segments 227.

The length of the first segment 226 or segments 226 and the length of the second segment 227 or segments 227 is selected such that when the rod 103 has reached its maximum desired extension from the block 101 or blocks 101, the stop 223 will cause the release rod 225 or release rods 225 to pull each plug 220 from each cavity 222.

Optionally, rather than having the release rod 225, a gas (preferably, air) actuator, designated herein as the "release actuator," which has a piston slidably mounted within a housing from which a rod, designated herein as the "release actuator rod," exits, with a first end of the release actuator rod being connected to the piston within the release acutator and the second end of the release actuator rod being connected to each plug 220. The housing for the release actuator is attached to the hinge 219 in such a manner that each plug 220 will be pulled from its respective cavity 222 as the first end of the release4 actuator rod is moved farther into the release actuator housing. (Of course, a separate release actuator could be used for each plug 220.) Injecting gas through a valve into the housing on the side of the piston to which the release actuator rod is attached will cause each plug 220 to be pulled from each cavity 222.

The Restraint also preferably has the ability to maintain the rod 103 at its maximum desired extension from the block 101 or blocks 101.

A plate 239 having an aperture 240 is attached rigidly directly or indirectly to the support structure 108. A slide 241 is slidably mounted to the rod 103 and oriented such that a spring 242 termed the "slide spring" 242 or the like attached to the slide 241 urges a first end 242 of the slide 241 toward the plate 239. The aperture 240 and the slide 241 are sized and positioned so that when the rod 103 is at its maximum desired extension from the block 101 or blocks 101, the aperture 240 and the slide 241 are sufficiently aligned that the first end 242 of the slide 241 enters the aperture 240. Optionally, rather than having an aperture 240, the plate 239 could simply end at the same point as the aperture 240 is located. Otherwise, the plate 239 is constructed to be beside the slide 241 throughout the movement of the rod 103.

Furthermore, a first end 243 of a cable 244 is attached to any portion of the lap bar 203 which moves farther from the slide 241 as the lap bar 203 is rotated toward the desired angle, with respect to the rod 103, to retain a person in a seat to which the support structure 108 has been attached. A second end 245 of the cable 244 is connected to a second end 246 of the slide 241. Intermediate between the first end 243 of the cable 244 and the second end 245 of the cable 244 is a device for changing the direction of a force 247, preferably a pulley 247, oriented such that as the lap bar 203 is rotated toward the desire angle, with respect to the rod 103, to retain a person in a seat to which the support structure 108 has been attached, the cable 244 pulls the slide 241 from the aperture 240, thereby permitting the rod 103 to be pushed farther into the block 101 or blocks 101. Of course, the length of the cable 244 is selected such that the slide 241 will remain in the aperture 240 until the lap bar 203 is rotated but not after the lap bar 203 has been rotated.

Preferably, an inner sleeve 248 is slidably mounted within an outer sleeve 249.

When these sleeves 248, 249 are employed, the first end 202 of a non-rotatable lap bar 203 is connected to the inner sleeve 248, preferably near a first end 250 of such inner sleeve 248, rather than being connected directly to the second end 115 of the rod 103; the second end 115 of the rod 103 is connected to the inner sleeve 248; and the support structure 108 is connected the outer sleeve 248, which outer sleeve 249 is to be attached to a seat when the lap retainer 201 is used.

The means for exerting a force away from the support structure 108 is connected to both the inner sleeve 248 and the outer sleeve 249. In the case of a gas cylinder 210, the housing 215 is, preferably, connected to the outer sleeve 248; and the second end 218 of the cylinder rod 212 is, preferably, attached to the inner sleeve 249. (Of course, the lap retainer 201 will function properly if, instead, the housing 215 is connected to the inner sleeve 249; and the second end 218 of the cylinder rod 212 is attached to the outer sleeve 248. In fact, the lap retainer 201 will function properly if everything designated herein as being connected to, or constituting a part of, the inner sleeve 248 is connected to, or constitutes a part of, the outer sleeve 249 and everything designated herein as being attached to, or constituting a part of, the outer sleeve 249 is connected to, or constitutes a part of, the inner sleeve 248.)

When sleeves 248, 249 are utilized with a lap bar 203 that is rotatable, connections are the same as described above for the non-rotatable lap bar except that first end 202 of the lap bar 203 is rotatably connected to a hinge 219; and the hinge 219 is connected to the inner sleeve 248, preferably near the first end 250 of such inner sleeve 248. (Also, the second end 218 of the cylinder rod 212 or the housing 215 may continue to be connected to the hinge 219, rather than to the inner sleeve 249, as also may be the extension actuator housing or the second end of the extension actuator rod.)

In all cases when sleeves 248, 249 are used, a second end 251 of the inner sleeve 248 and a first end 252 of the end of the outer sleeve 249 are substantially open. Since, preferably, the inner sleeve 248 slides into the outer sleeve 249, this dictates that the first end 252 of the outer sleeve 249 be open. The stop 223 is preferably a second end 253 of the outer sleeve 249. Furthermore, the plate 239 is a first side 254 of the outer sleeve 249. And the slide 242 is slidably mounted to a first wall 255 of the inner sleeve 248, which first wall 255 slides adjacent to the first side 254 of the outer sleeve 249 and contains an aperture 256 that is sized and positioned so that when the rod 103 is at its maximum desired extension from the block 101 or blocks 101, the aperture 256 is sufficiently aligned with the aperture 240 in the first side 254 of the outer sleeve 249 that the first end 242 of the slide 241 enters aperture 256 and aperture 240.

Alternate exemplary versions of the rod lock 1 are any type of ratchet lock that is well known in the art and a hydraulic lock 257.

Figure 10:
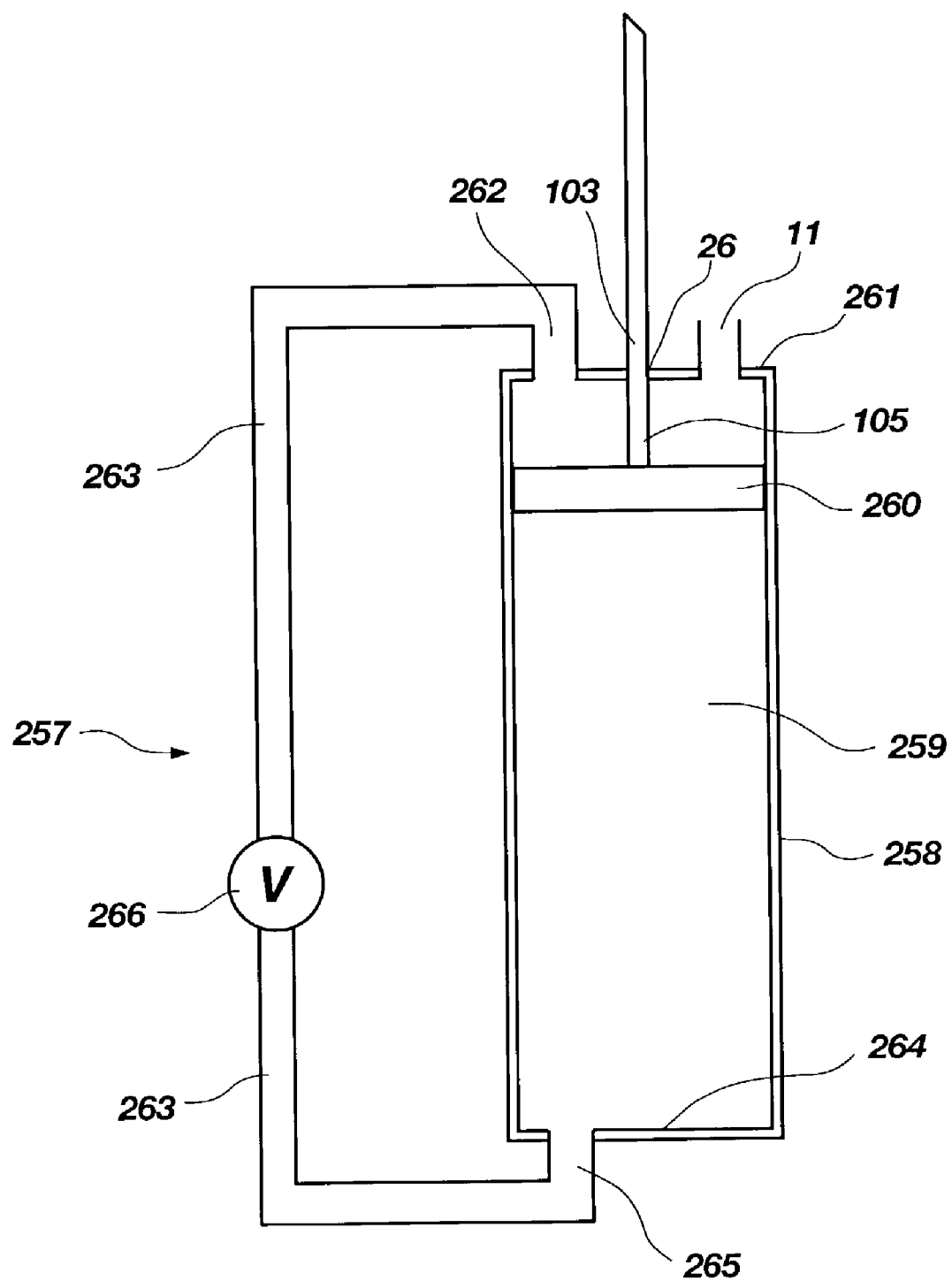
FIG. 10 shows the hydraulic lock.

The hydraulic lock 257 has, as portrayed in FIG. 10, a housing 258 having a bore 259 within which a piston 260 is slidably mounted. The housing 258 has a first end 261 containing an aperture 262 through which the rod 103 passes before having the first end 105 of the rod 103 attached to the piston 260. Of course, the second end 115 of the rod is attached just as described above when the locking apparatus serves as the rod lock 1.

Attached to the housing 258 at or nearer the first end 261 of the housing 258 than the piston 260 will ever be and communicating with the bore 259 of the housing 258 is a first end 262 of a tube 263. Attached to the housing 258 at or nearer the second end 264 of the housing 258 than the piston 260 will ever be and communicating with the bore 259 of the housing 258 is a second end 265 of the tube 263. In the tube 263 at a location intermediate between the first end 262 of the tube 263 and the second end 265 of the tube 263 is a valve 266.

Hydraulic fluid cannot flow through or around the piston 260. Therefore, the only way for hydraulic fluid to flow from one end 261, 264 of the housing 258 to the other end 264, 261 of the housing 258 is through the tube 263. This can occur when the valve 266 is open but not when the valve 266 is closed. Thus, because of the incompressibility of hydraulic fluid, the piston 260 and, consequently, the rod 103 can move only when the valve 266 is open.

A preferred option to accompany any embodiment of the lap retainer 201 is a shoulder retainer 401.

Figure 8:
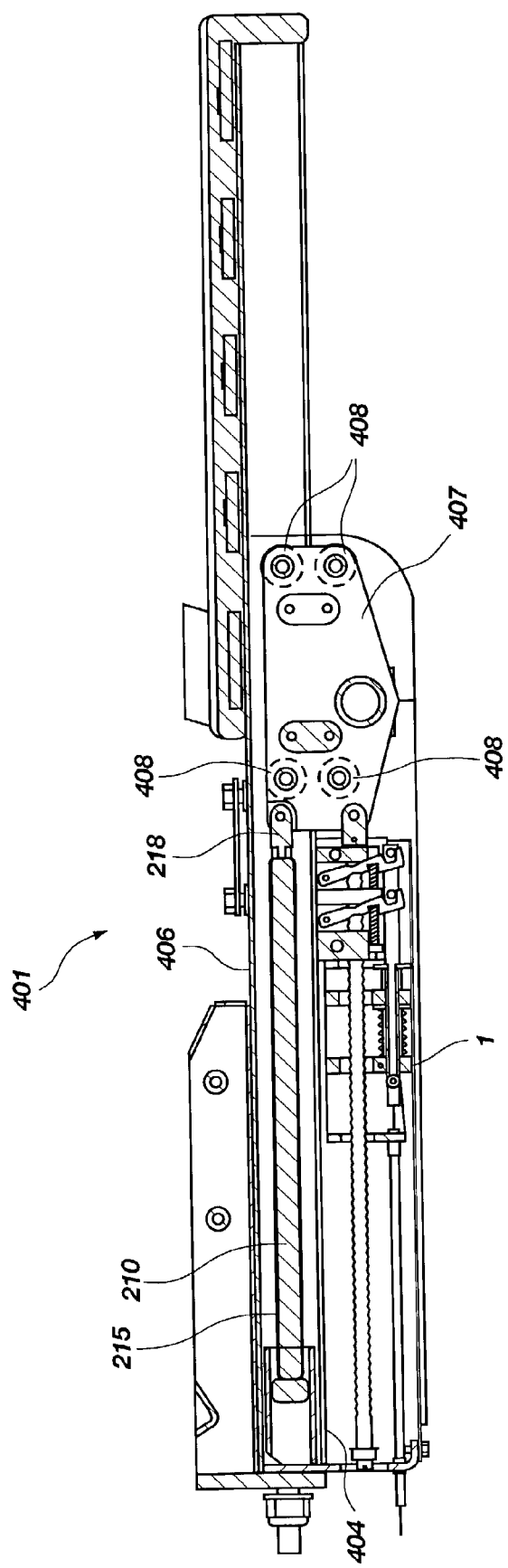
FIG. 8 portrays the preferred embodiment of the shoulder retainer.
Figure 9:
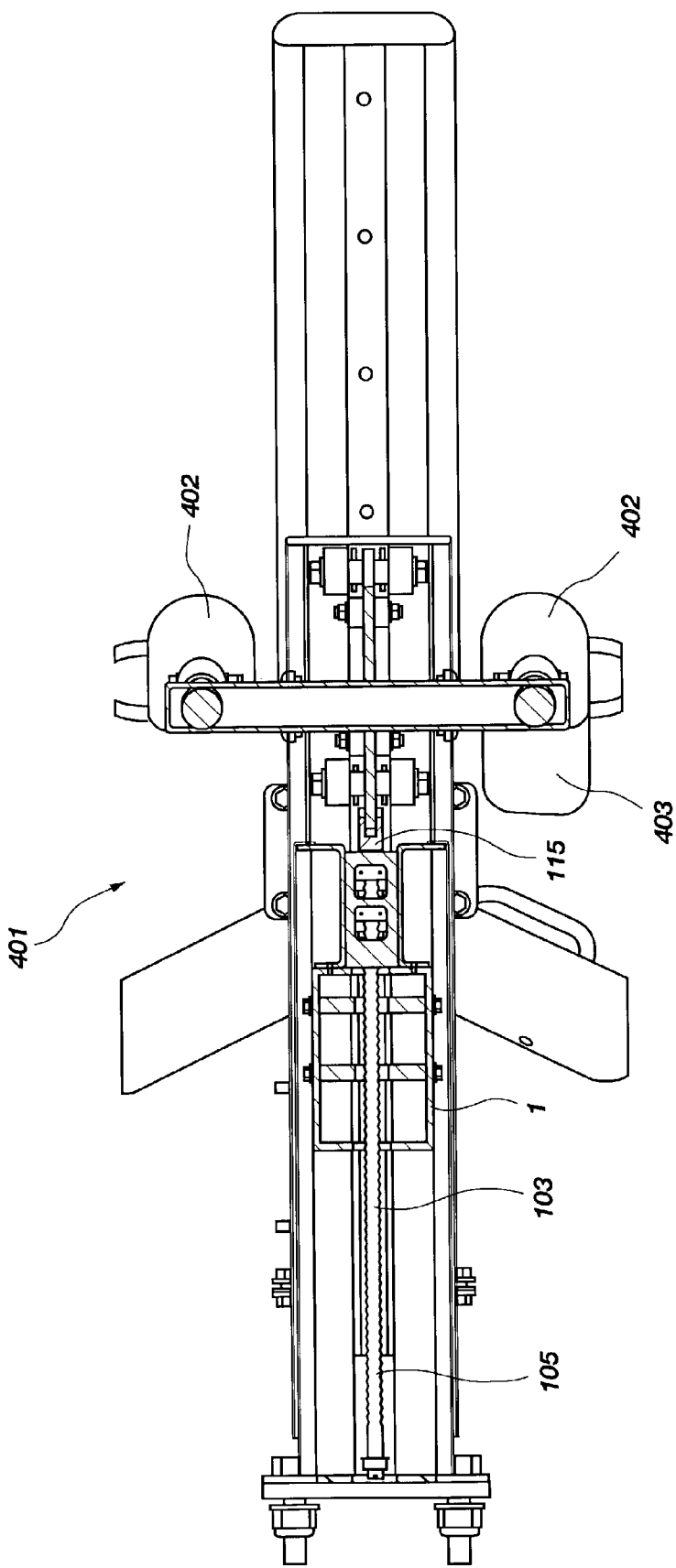
FIG. 9 is a lateral view of the preferred embodiment of the shoulder retainer with the shoulder retainer rotated ninety degrees around the longitudinal axis of the rod with respect to the view of FIG. 8.

The shoulder retainer 401 has, as shown in FIG. 8 and FIG. 9, a rod lock 1. The rod lock 1 can be any of the versions of the rod lock 1 discussed with respect to the lap retainer 201, and the structure of such versions, including the means for releasing the rod 103, is virtually identical to that described above with respect to the lap retainer 201.

A first end 105 of a rod 103 is inserted into the rod lock 1. A shoulder bar 402 is either directly or indirectly attached to the second end 115 of the rod 103. The shoulder bar 402 consists of two or more forwardly and downwardly extending projections 403 shaped to fit around a person's left and right shoulders for retaining such shoulders in a seat to which the rod lock 1 has been attached and oriented so that movement of the rod 103 will tighten or loosen such retention.

Also, preferably, as with the lap retainer 201, the housing 215 of a gas cylinder 210 is connected directly or indirectly to the rod lock 1; and a second end 218 of the cylinder rod 212 is attached directly or indirectly to the shoulder bar 402. (Again, as was the case with the lap retainer 201, these connections can be reversed; and the gas cylinder 210 can be replaced with an extension actuator.)

Preferably, a C-channel 404 is to have the side 405 opposite to the longitudinal slot 406 attached to the back of a seat. A wheeled cart 407 has two or more wheels 408 on a first side 409 of the cart 407 and two or more wheels on a second side 410 of the cart 407 with the wheels 408 spaced so that some wheels 408 will be within the C-channel 404 while other wheels 408 will be outside the C-channel 404. The second end 115 of the rod 103 is attached to the cart 407, the shoulder bar 402 is attached to the cart 407, and the second end 218 of the cylinder rod 212 is attached to the cart 407. The rod lock 1 and the housing 215 of the gas cylinder 210 are connected to the C-channel 404.

We claim:

1. A restraint, which comprises:
   a support structure;
   two blocks, each block containing an aperture with a center and having a first end and a second end and, between the first end of said block and the center of the aperture, being rotatably attached to said support structure;
   a rod having a first end, a second end, and a length, having a portion of said rod beginning near the first end of said rod vary periodically in thickness along the length of said rod with the maximum periodic thickness being less than the minimum diameter of the aperture in said blocks, and having the second end of said rod available for connection to a restraining device, said blocks being located at such a distance from one another that the aperture in one of said blocks will be at one of the points of minimum thickness of said rod when the aperture in the other of said blocks is at one of the points of maximum thickness of said rod, said rod being removably inserted into the apertures of said blocks;
a means for biasing said blocks;
a hinge attached to the second end of said rod;
a lap bar having a first end attached to said hinge and having a second end angled so that such second end is generally parallel to said rod;
a lever arm slidably mounted on said support structure and connected to said blocks near the second end of each of said blocks;
a sheathed cable having the sheathing of said cable attached to said support structure and having said cable connected to a first end of said lever arm so that when said cable pulls said lever arm, the biasing of said blocks is reduced, allowing said rod to be removed;
a gas cylinder having a housing, a first end of a cylinder rod attached to a piston slidably mounted within a bore of the housing, containing pressurized gas on a side of the piston opposite to the side on which the cylinder rod is located, said gas cylinder being connected to said support structure and having a second end of the cylinder rod attached to said hinge;
a spring;
a plug biased by said spring to enter a cavity shaped to accommodate said plug within a first end of said lap bar;
a stop attached to said support structure;
a telescoping release rod having a first segment and a second segment with said first segment attached to said stop and with said second segment attached to said plug, said telescoping release rod having the length of the first segment and the length of the second segment selected such that when the rod has reached its maximum desired extension from the blocks, the stop will cause said release rod to pull said plug from the cavity;
a plate having an aperture, said plate being rigidly attached to said support structure;
a slide spring;
a slide slidably mounted to said rod and oriented such that said slide spring urges a first end of said slide toward said plate, said plate constructed to be beside said slide throughout the movement of said rod, the aperture of said plate and said slide being sized and positioned such that when the rod is at its maximum desired extension from the blocks, the aperture and said slide are sufficiently aligned that a first end of said slide enters the aperture;
a cable attached to a portion of said lap bar that moves farther from said slide as said lap bar is rotated toward a desired angle, with respect to said rod, to retain a person, said cable having a second end connected to a second end of said slide; and
a means for changing the direction of a force oriented such that as said lap bar is rotated toward the desired angle, said cable, with its length being selected such that said slide will remain in the aperture until said lap bar is rotated but not after said lap bar has been rotated, pulls said slide from the aperture, thereby permitting the rod to be pushed farther into said blocks.

2. The restraint as recited in claim 1, further comprising:
a second rod lock;
a second rod having a first end for insertion into said rod lock and also having a second end; and
a shoulder bar attached to the second end of said second rod.

3. The restraint as recited in claim 2, further comprising:
a means for exerting a force away from said second rod lock and generally toward said shoulder bar, said means for exerting a force away from said second rod lock being connected to said second rod lock and to said shoulder bar.

4. The restraint as recited in claim 3, wherein:
said means for exerting a force away from said second rod lock comprises:
a gas cylinder having a housing, a first end of a cylinder rod attached to a piston slidably mounted within a bore of the housing, containing pressurized gas on a side of the piston opposite to the side on which the cylinder rod is located, said gas cylinder being connected to said rod lock and having a second end of the cylinder rod attached to said shoulder bar.

5. The restraint as recited in claim 3, wherein:
said second rod lock is a locking apparatus.

6. The restraint as recited in claim 5, wherein:
said means for exerting a force away from said second rod lock comprises:
a gas cylinder having a housing, a first end of a cylinder rod attached to a piston slidably mounted within a bore of the housing, containing pressurized gas on a side of the piston opposite to the side on which the cylinder rod is located, said gas cylinder being connected to said rod lock and having a second end of the cylinder rod attached to said shoulder bar.

7. The restraint as recited in claim 3, wherein:
said second rod lock is a hydraulic lock.

8. The restraint as recited in claim 7, wherein:
said means for exerting a force away from said second rod lock comprises:
a gas cylinder having a housing, a first end of a cylinder rod attached to a piston slidably mounted within a bore of the housing, containing pressurized gas on a side of the piston opposite to the side on which the cylinder rod is located, said gas cylinder being connected to said rod lock and having a second end of the cylinder rod attached to said shoulder bar.

9. The restraint as recited in claim 2, wherein:
said second rod lock is a locking apparatus.

10. The restraint as recited in claim 2, wherein:
said second rod lock is a hydraulic lock.

11. The restraint as recited in claim 1, further comprising:
a second support structure;
two additional blocks, each additional block containing an aperture with a center and having a first end and a second end and, between the first end of said additional block and the center of the aperture, being rotatably attached to said second support structure;
a second rod having a first end, a second end, and a length, having a portion of said second rod beginning near the first end of second said rod vary periodically in thickness along the length of said second rod with the maximum periodic thickness being less than the minimum diameter of the aperture in said additional blocks, and having the second end of said second rod available for connection to a restraining device, said additional blocks being located at such a distance from one another that the aperture in one of said additional blocks will be at one of the points of minimum thickness of said second rod when the aperture in the other of said additional blocks is at one of the points of maximum thickness of said second rod, said second rod being removably inserted into the apertures of said additional blocks;

a means for biasing said additional blocks;
a second lever arm slidably mounted on said second support structure and connected to said additional blocks near the second end of each of said additional blocks;
a second sheathed cable having the sheathing of said second cable attached to said second support structure and having said second cable connected to a first end of said second lever arm so that when said second cable pulls said second lever arm, the biasing of said additional blocks is reduced, allowing said second rod to be removed;
a second gas cylinder having a housing, a first end of a cylinder rod attached to a piston slidably mounted within a bore of the housing of said second gas cylinder, containing pressurized gas on a side of the piston within the bore of the housing of said second gas cylinder opposite to the side on which the cylinder rod of said second gas cylinder is located, the housing of said second gas cylinder being connected to said second support structure; and
a shoulder bar connected to the second end of said second rod and to a second end of said cylinder rod of said second gas cylinder.

12. A restraint, which comprises:
a hydraulic lock, which comprises:
   a housing having a bore, having a first end containing an aperture, and having a second end;
   a piston slidably mounted within the bore of said housing;
   a tube having a first end attached to said housing of said hydraulic lock at or nearer the first end of said housing of said hydraulic lock than said piston will ever be and communicating with the bore of said housing of said hydraulic lock and also having a second end attached to said housing of said hydraulic lock at or nearer the second end of said housing of said hydraulic lock than said piston will ever be and communicating with the bore of said housing of said hydraulic lock; and
   a valve in said tube at a location intermediate between the first end and the second end of said tube;
a rod having a first end, a second end, and a length, said rod having a first end attached to said piston;
a hinge attached to the second end of said rod;
a lap bar having a first end attached to said hinge and having a second end angled so that such second end is generally parallel to said rod;
a gas cylinder having a housing, a first end of a cylinder rod attached to a piston slidably mounted within a bore of the housing of said gas cylinder, containing pressurized gas on a side of the piston opposite to the side on which the cylinder rod is located, said gas cylinder being connected to said housing of said hydraulic lock and having a second end of the cylinder rod attached to said hinge;
a spring;
a plug biased by said spring to enter a cavity shaped to accommodate said plug within a first end of said lap bar;
a stop attached to said housing of said hydraulic lock;
a telescoping release rod having a first segment and a second segment with said first segment attached to said stop and with said second segment attached to said plug, said telescoping release rod having the length of the first segment and the length of the second segment selected such that when the rod has reached its maximum desired extension from the blocks, the stop will cause said release rod to pull said plug from the cavity;
a plate having an aperture, said plate being rigidly attached to said housing of said hydraulic lock;
a slide spring;
a slide slidably mounted to said rod and oriented such that said slide spring urges a first end of said slide toward said plate, said plate constructed to be beside said slide throughout the movement of said rod, the aperture of said plate and said slide being sized and positioned such that when the rod is at its maximum desired extension from said hydraulic lock, the aperture and said slide are sufficiently aligned that a first end of said slide enters the aperture;
a cable attached to a portion of said lap bar that moves farther from said slide as said lap bar is rotated toward a desired angle, with respect to said rod, to retain a person, said cable having a second end connected to a second end of said slide; and
a means for changing the direction of a force oriented such that as said lap bar is rotated toward the desired angle, said cable, with its length being selected such that said slide will remain in the aperture until said lap bar is rotated but not after said lap bar has been rotated, pulls said slide from the aperture, thereby permitting the rod to be pushed farther into said hydraulic lock.

13. The restraint as recited in claim 12, further comprising:
a second hydraulic lock, which comprises:
   a housing having a bore, having a first end containing an aperture, and having a second end;
   a piston slidably mounted within the bore of said housing of said second hydraulic lock;
   a tube having a first end attached to said housing of said second hydraulic lock at or nearer the first end of said housing of said second hydraulic lock than said piston within the bore of said housing of said second hydraulic lock will ever be and communicating with the bore of said housing of said second hydraulic lock and also having a second end attached to said housing of said second hydraulic lock at or nearer the second end of said housing of said second hydraulic lock than said piston within the bore of said housing of said second hydraulic lock will ever be and communicating with the bore of said housing of said second hydraulic lock; and
   a valve in said tube of said second hydraulic lock, said valve in said tube of said second hydraulic lock being at a location intermediate between the first end and the second end of said tube of said second hydraulic lock;
a second rod having a first end, a second end, and a length, said second rod having a first end attached to said piston within the bore of said housing of said second hydraulic lock;
a second gas cylinder having a housing, a first end of a cylinder rod attached to a piston slidably mounted within a bore of the housing of said second gas cylinder, containing pressurized gas on a side of the piston within the bore of the housing of said second gas cylinder opposite to the side on which the cylinder rod of said second gas cylinder is located, said second gas cylinder being connected to said housing of said second hydraulic lock; and
a shoulder bar connected to the second end of said second rod and to a second end of the cylinder rod of said second gas cylinder.

14. A restraint, which comprises:
an outer sleeve having an open first end, having a second end, and having a first side containing an aperture;
an inner sleeve having a first end, a first wall containing and aperture, and a substantially open second end, said inner sleeve being slidably mounted within said outer sleeve;
a support structure connected to said outer sleeve;
two blocks, each block containing an aperture with a center and having a first end and a second end and, between the first end of said block and the center of the aperture, being rotatably attached to said support structure;
a rod having a first end, a second end, and a length, having a portion of said rod beginning near the first end of said rod vary periodically in thickness along the length of said rod with the maximum periodic thickness being less than the minimum diameter of the aperture in said blocks, and having the second end of said rod connected to said inner sleeve, said blocks being located at such a distance from one another that the aperture in one of said blocks will be at one of the points of minimum thickness of said rod when the aperture in the other of said blocks is at one of the points of maximum thickness of said rod, said rod being removably inserted into the apertures of said blocks;
a means for biasing said blocks;
a hinge attached to said inner sleeve near the first end of said inner sleeve;
a lap bar having a first end attached to said hinge and having a second end angled so that such second end is generally parallel to said rod;
a lever arm slidably mounted on said support structure and connected to said blocks near the second end of each of said blocks;
a sheathed cable having the sheathing of said cable attached to said support structure and having said cable connected to a first end of said lever arm so that when said cable pulls said lever arm, the biasing of said blocks is reduced, allowing said rod to be removed;
a gas cylinder having a housing, a first end of a cylinder rod attached to a piston slidably mounted within a bore of the housing, containing pressurized gas on a side of the piston opposite to the side on which the cylinder rod is located, the housing of said gas cylinder being connected to said hinge and having a second end of the cylinder rod attached to said outer sleeve;
a spring;
a plug biased by said spring to enter a cavity shaped to accommodate said plug within a first end of said lap bar;
a telescoping release rod having a first segment and a second segment with said first segment attached to the second end of said outer sleeve and with said second segment attached to said plug, said telescoping release rod having the length of the first segment and the length of the second segment selected such that when the rod has reached its maximum desired extension from the blocks, the second end of said outer sleeve will cause said release rod to pull said plug from the cavity;
a slide spring;
a slide slidably mounted to a first wall of said inner sleeve, said first wall of said inner sleeve sliding adjacent to the first side of said outer sleeve and oriented such that said slide spring urges a first end of said slide toward the first side of said outer sleeve, the first side of said outer sleeve being constructed to have a portion of the first side of said outer sleeve beside said slide throughout the movement of said rod, with the aperture in the first wall of said inner sleeve, the aperture in the first side of said outer sleeve, and said slide being sized and positioned such that when the rod is at its maximum desired extension from the blocks, the aperture in the first wall of said inner sleeve, the aperture in the first side of said outer sleeve, and said slide are sufficiently aligned that a first end of said slide enters the aperture in the first wall of said inner sleeve and the aperture in the first side of said outer sleeve;
a cable attached to a portion of said lap bar that moves farther from said slide as said lap bar is rotated toward a desired angle, with respect to said rod, to retain a person, said cable having a second end connected to a second end of said slide; and
a means for changing the direction of a force oriented such that as said lap bar is rotated toward the desired angle, said cable, with its length being selected such that said slide will remain in the aperture until said lap bar is rotated but not after said lap bar has been rotated, pulls said slide from the aperture in the first side of said outer sleeve, thereby permitting the rod to be pushed farther into said blocks.

15. The restraint as recited in claim 14, further comprising:
a C-channel;
a wheeled cart having two or more wheels on a first side of said cart and two or more wheels on a second side of said cart with the wheels so spaced that some wheels will be within said C-channel while other sheels will be outside said C-channel;
a second support structure connected to said C-channel;
two additional blocks, each additional block containing an aperture with a center and having a first end and a second end and, between the first end of said additional block and the center of the aperture, being rotatably attached to said second support structure;
a second rod having a first end, a second end, and a length, having a portion of said second rod beginning near the first end of second said rod vary periodically in thickness along the length of said second rod with the maximum periodic thickness being less than the minimum diameter of the aperture in said additional blocks, and having the second end of said second rod connected to said wheeled cart, said additional blocks being located at such a distance from one another that the aperture in one of said additional blocks will be at one of the points of minimum thickness of said second rod when the aperture in the other of said additional blocks is at one of the points of maximum thickness of said second rod, said second rod being removably inserted into the apertures of said additional blocks;
a means for biasing said additional blocks;
a second lever arm slidably mounted on said second support structure and connected to said additional blocks near the second end of each of said additional blocks;
a second sheathed cable having the sheathing of said second cable attached to said second support structure and having said second cable connected to a first end of said second lever arm so that when said second cable pulls said second lever arm, the biasing of said additional blocks is reduced, allowing said second rod to be removed;
a second gas cylinder having a housing, a first end of a cylinder rod attached to a piston slidably mounted within a bore of the housing of said second gas cylinder, containing pressurized gas on a side of the piston within the bore of the housing of said second gas cylinder opposite to the side on which the cylinder rod of said second gas cylinder is located, the housing of said second gas cylinder being connected to said C-channel with a second end of the cylinder rod of said second gas cylinder being connected to said wheeled cart; and a shoulder bar connected said wheeled cart.

16. A restraint, which comprises:

an outer sleeve having an open first end, having a second end, and having a first side containing an aperture;

an inner sleeve having a first end, a first wall containing and aperture, and a substantially open second end, said inner sleeve being slidably mounted within said outer sleeve;

a hydraulic lock connected to said outer sleeve, which hydraulic lock comprises:
  a housing having a bore, having a first end containing an aperture, and having a second end;
  a piston slidably mounted within the bore of said housing;
  a tube having a first end attached to said housing of said hydraulic lock at or nearer the first end of said housing of said hydraulic lock than said piston will ever be and communicating with the bore of said housing of said hydraulic lock and also having a second end attached to said housing of said hydraulic lock at or nearer the second end of said housing of said hydraulic lock than said piston will ever be and communicating with the bore of said housing of said hydraulic lock; and
  a valve in said tube at a location intermediate between the first end and the second end of said tube;

a rod having a first end, a second end, and a length, said rod having a first end attached to said piston and;

a hinge attached to said inner sleeve near the first end of said inner sleeve;

a lap bar having a first end attached to said hinge and having a second end angled so that such second end is generally parallel to said rod;

a gas cylinder having a housing, a first end of a cylinder rod attached to a piston slidably mounted within a bore of the housing of said gas cylinder, containing pressurized gas on a side of the piston opposite to the side on which the cylinder rod is located, said gas cylinder being connected to said hinge and having a second end of the cylinder rod attached to said outer sleeve;

a spring;

a plug biased by said spring to enter a cavity shaped to accommodate said plug within a first end of said lap bar;

a telescoping release rod having a first segment and a second segment with said first segment attached to the second end of said outer sleeve and with said second segment attached to said plug, said telescoping release rod having the length of the first segment and the length of the second segment selected such that when the rod has reached its maximum desired extension from the blocks, the second end of said outer sleeve will cause said release rod to pull said plug from the cavity;

a plate having an aperture, said plate being rigidly attached to said housing of said hydraulic lock;

a slide spring;

a slide slidably mounted to a first wall of said inner sleeve, said first wall of said inner sleeve sliding adjacent to the first side of said outer sleeve and oriented such that said slide spring urges a first end of said slide toward the first side of said outer sleeve, the first side of said outer sleeve being constructed to have a portion of the first side of said outer sleeve beside said slide throughout the movement of said rod, with the aperture in the first wall of said inner sleeve, the aperture in the first side of said outer sleeve, and said slide being sized and positioned such that when the rod is at its maximum desired extension from said hydraulic lock, the aperture in the first wall of said inner sleeve, the aperture in the first side of said outer sleeve, and said slide are sufficiently aligned that a first end of said slide enters the aperture in the first wall of said inner sleeve and the aperture in the first side of said outer sleeve;

a cable attached to a portion of said lap bar that moves farther from said slide as said lap bar is rotated toward a desired angle, with respect to said rod, to retain a person, said cable having a second end connected to a second end of said slide; and a means for changing the direction of a force oriented such that as said lap bar is rotated toward the desired angle, said cable, with its length being selected such that said slide will remain in the aperture until said lap bar is rotated but not after said lap bar has been rotated, pulls said slide from the aperture in the first side of said outer sleeve, thereby permitting the rod to be pushed farther into said hydraulic lock.

17. The restraint as recited in claim 16, further comprising:

a C-channel;

a wheeled cart having two or more wheels on a first side of said cart and two or more wheels on a second side of said cart with the wheels so spaced that some wheels will be within said C-channel while other sheels will be outside said C-channel;

a second hydraulic lock connected to said C-channel, which second hydraulic lock comprises:
  a housing having a bore, having a first end containing an aperture, and having a second end;
  a piston slidably mounted within the bore of said housing of said second hydraulic lock;
  a tube having a first end attached to said housing of said second hydraulic lock at or nearer the first end of said housing of said second hydraulic lock than said piston within the bore of said housing of said second hydraulic lock will ever be and communicating with the bore of said housing of said second hydraulic lock and also having a second end attached to said housing of said second hydraulic lock at or nearer the second end of said housing of said second hydraulic lock than said piston within the bore of said housing of said second hydraulic lock will ever be and communicating with the bore of said housing of said second hydraulic lock; and
  a valve in said tube of said second hydraulic lock, said valve in said tube of said second hydraulic lock being at a location intermediate between the first end and the second end of said tube of said second hydraulic lock;

a second rod having a first end, a second end, and a length, said second rod having a first end attached to said piston within the bore of said housing of said second hydraulic lock and having a second end connected to said wheeled cart;

a second gas cylinder having a housing, a first end of a cylinder rod attached to a piston slidably mounted within a bore of the housing of said second gas cylinder, containing pressurized gas on a side of the piston within the bore of the housing of said second gas cylinder opposite to the side on which the cylinder rod of said second gas cylinder is located, the housing of said second gas cylinder being connected to said C-channel with a second end of the cylinder rod of said second has cylinder being connected to said wheeled cart; and a shoulder bar connected said wheeled cart.

18. A restraint, which comprises:

a support structure;

two blocks, each block containing an aperture with a center and having a first end and a second end and, between the first end of said block and the center of the aperture, being rotatably attached to said support structure;

a rod having a first end, a second end, and a length, having a portion of said rod beginning near the first end of said rod vary periodically in thickness along the length of said rod with the maximum periodic thickness being less than the minimum diameter of the aperture in said blocks, and having the second end of said rod available for connection to a restraining device, said blocks being located at such a distance from one another that the aperture in one of said blocks will be at one of the points of minimum thickness of said rod when the aperture in the other of said blocks is at one of the points of maximum thickness of said rod, said rod being removably inserted into the apertures of said blocks;

a means for biasing said blocks;

a hinge attached to the second end of said rod;

a lap bar having a first end attached to said hinge and having a second end angled so that such second end is generally parallel to said rod;

a lever arm slidably mounted on said support structure and connected to said blocks near the second end of each of said blocks;

a block actuator having a housing and a block actuator rod with a second end, said block actuator housing being attached to said support structure with the second end of the block actuator rod being connected to said lever arm;

an extension actuator having a housing and an extension actuator rod with a second end, said extension actuator housing being attached to said support structure with the second end of the extension actuator rod being attached to said hinge;

a spring;

a plug biased by said spring to enter a cavity shaped to accommodate said plug within a first end of said lap bar;

a release actuator having a housing and a release actuator rod with a second end, said release actuator housing being attached to said hinge with the second end of the release actuator rod being attached to said plug so that said plug will be withdrawn from the cavity as the release actuator rod moves farther into the release actuator housing;

a plate having an aperture, said plate being rigidly attached to said support structure;

a slide spring;

a slide slidably mounted to said rod and oriented such that said slide spring urges a first end of said slide toward said plate, said plate constructed to be beside said slide throughout the movement of said rod, the aperture of said plate and said slide being sized and positioned such that when the rod is at its maximum desired extension from the blocks, the aperture and said slide are sufficiently aligned that a first end of said slide enters the aperture;

a cable attached to a portion of said lap bar that moves farther from said slide as said lap bar is rotated toward a desired angle, with respect to said rod, to retain a person, said cable having a second end connected to a second end of said slide; and a means for changing the direction of a force oriented such that as said lap bar is rotated toward the desired angle, said cable, with its length being selected such that said slide will remain in the aperture until said lap bar is rotated but not after said lap bar has been rotated, pulls said slide from the aperture, thereby permitting the rod to be pushed farther into said blocks.

19. The restraint as recited in claim 18, further comprising:

a second support structure;

two additional blocks, each additional block containing an aperture with a center and having a first end and a second end and, between the first end of said additional block and the center of the aperture, being rotatably attached to said second support structure;

a second rod having a first end, a second end, and a length, having a portion of said second rod beginning near the first end of second said rod vary periodically in thickness along the length of said second rod with the maximum periodic thickness being less than the minimum diameter of the aperture in said additional blocks, and having the second end of said second rod available for connection to a restraining device, said additional blocks being located at such a distance from one another that the aperture in one of said additional blocks will be at one of the points of minimum thickness of said second rod when the aperture in the other of said additional blocks is at one of the points of maximum thickness of said second rod, said second rod being removably inserted into the apertures of said additional blocks;

a means for biasing said additional blocks;

a second lever arm slidably mounted on said second support structure and connected to said additional blocks near the second end of each of said additional blocks;

a second block actuator having a housing and a block actuator rod with a second end, said block actuator housing of said second block actuator being attached to said support structure with the second end of the block actuator rod of said second block actuator being connected to said lever arm;

a second extension actuator having a housing and an extension actuator rod with a second end, said extension actuator housing of said second extension actuator being attached to said second support structure; and a shoulder bar connected to the second end of said second rod and to the second end of the cylinder rod of said second extension actuator.

20. A restraint, which comprises:

a hydraulic lock, which comprises:

a housing having a bore, having a first end containing an aperture, and having a second end;

a piston slidably mounted within the bore of said housing;

a tube having a first end attached to said housing of said hydraulic lock at or nearer the first end of said housing of said hydraulic lock than said piston will ever be and communicating with the bore of said housing of said hydraulic lock and also having a second end attached to said housing of said hydraulic lock at or nearer the second end of said housing of said hydraulic lock than said piston will ever be and communicating with the bore of said housing of said hydraulic lock; and a valve in said tube at a location intermediate between the first end and the second end of said tube;

a rod having a first end, a second end, and a length, said rod having a first end attached to said piston;

a hinge attached to the second end of said rod;

a lap bar having a first end attached to said hinge and having a second end angled so that such second end is generally parallel to said rod;

an extension actuator having a housing and an extension actuator rod with a second end, said extension actuator housing being attached to said support structure with the second end of the extension actuator rod being attached to said hinge;

a spring;

a plug biased by said spring to enter a cavity shaped to accommodate said plug within a first end of said lap bar;

a release actuator having a housing and a release actuator rod with a second end, said release actuator housing being attached to said hinge with the second end of the release actuator rod being attached to said plug so that said plug will be withdrawn from the cavity as the release actuator rod moves farther into the release actuator housing;

a plate having an aperture, said plate being rigidly attached to said housing of said hydraulic lock;

a slide spring;

a slide slidably mounted to said rod and oriented such that said slide spring urges a first end of said slide toward said plate, said plate constructed to be beside said slide throughout the movement of said rod, the aperture of said plate and said slide being sized and positioned such that when the rod is at its maximum desired extension from said hydraulic lock, the aperture and said slide are sufficiently aligned that a first end of said slide enters the aperture;

a cable attached to a portion of said lap bar that moves farther from said slide as said lap bar is rotated toward a desired angle, with respect to said rod, to retain a person, said cable having a second end connected to a second end of said slide; and a means for changing the direction of a force oriented such that as said lap bar is rotated toward the desired angle, said cable, with its length being selected such that said slide will remain in the aperture until said lap bar is rotated but not after said lap bar has been rotated, pulls said slide from the aperture, thereby permitting the rod to be pushed farther into said hydraulic lock.

21. The restraint as recited in claim 20, further comprising:

a second hydraulic lock, which comprises:

a housing having a bore, having a first end containing an aperture, and having a second end;

a piston slidably mounted within the bore of said housing of said second hydraulic lock;

a tube having a first end attached to said housing of said second hydraulic lock at or nearer the first end of said housing of said second hydraulic lock than said piston within the bore of said housing of said second hydraulic lock will ever be and communicating with the bore of said housing of said second hydraulic lock and also having a second end attached to said housing of said second hydraulic lock at or nearer the second end of said housing of said second hydraulic lock than said piston within the bore of said housing of said second hydraulic lock will ever be and communicating with the bore of said housing of said second hydraulic lock; and a valve in said tube of said second hydraulic lock, said valve in said tube of said second hydraulic lock being at a location intermediate between the first end and the second end of said tube of said second hydraulic lock;

a second rod having a first end, a second end, and a length, said second rod having a first end attached to said piston within the bore of said housing of said second hydraulic lock;

a second extension actuator having a housing and an extension actuator rod with a second end, said extension actuator housing of said second extension actuator being attached to said hydraulic lock; and a shoulder bar connected to the second end of said second rod and to the second end of the extension actuator rod of said second extension actuator.

22. A restraint, which comprises:

an outer sleeve having an open first end, having a second end, and having a first side containing an aperture;

an inner sleeve having a first end, a first wall containing and aperture, and a substantially open second end, said inner sleeve being slidably mounted within said outer sleeve;

a support structure connected to said outer sleeve;

two blocks, each block containing an aperture with a center and having a first end and a second end and, between the first end of said block and the center of the aperture, being rotatably attached to said support structure;

a rod having a first end, a second end, and a length, having a portion of said rod beginning near the first end of said rod vary periodically in thickness along the length of said rod with the maximum periodic thickness being less than the minimum diameter of the aperture in said blocks, and having the second end of said rod connected to said inner sleeve, said blocks being located at such a distance from one another that the aperture in one of said blocks will be at one of the points of minimum thickness of said rod when the aperture in the other of said blocks is at one of the points of maximum thickness of said rod, said rod being removably inserted into the apertures of said blocks;

a means for biasing said blocks;

a hinge attached to said inner sleeve near the first end of said inner sleeve;

a lap bar having a first end attached to said hinge and having a second end angled so that such second end is generally parallel to said rod;

a lever arm slidably mounted on said support structure and connected to said blocks near the second end of each of said blocks;

a block actuator having a housing and a block actuator rod with a second end, said block actuator housing being attached to said support structure with the second end of the block actuator rod being connected to said lever arm;

an extension actuator having a housing and an extension actuator rod with a second end, said extension actuator housing being attached to said hinge with the second end of the extension actuator rod being attached to said outer sleeve;

a spring;

a plug biased by said spring to enter a cavity shaped to accommodate said plug within a first end of said lap bar;

a release actuator having a housing and a release actuator rod with a second end, said release actuator housing being attached to said hinge with the second end of the release actuator rod being attached to said plug so that said plug will be withdrawn from the cavity as the release actuator rod moves farther into the release actuator housing;

a slide spring;

a slide slidably mounted to a first wall of said inner sleeve, said first wall of said inner sleeve sliding adjacent to the first side of said outer sleeve and oriented such that said slide spring urges a first end of said slide toward the first side of said outer sleeve, the first side of said outer sleeve being constructed to have a portion of the first side of said outer sleeve beside said slide throughout the movement of said rod, with the aperture in the first wall of said inner sleeve, the aperture in the first side of said outer sleeve, and said slide being sized and positioned such that when the rod is at its maximum desired extension from the blocks, the aperture in the first wall of said inner sleeve, the aperture in the first side of said outer sleeve, and said slide are sufficiently aligned that a first end of said slide enters the aperture in the first wall of said inner sleeve and the aperture in the first side of said outer sleeve;

a cable attached to a portion of said lap bar that moves farther from said slide as said lap bar is rotated toward a desired angle, with respect to said rod, to retain a person, said cable having a second end connected to a second end of said slide; and a means for changing the direction of a force oriented such that as said lap bar is rotated toward the desired angle, said cable, with its length being selected such that said slide will remain in the aperture until said lap bar is rotated but not after said lap bar has been rotated, pulls said slide from the aperture in the first side of said outer sleeve, thereby permitting the rod to be pushed farther into said blocks.

23. The restraint as recited in claim 22, further comprising:

a C-channel;

a wheeled cart having two or more wheels on a first side of said cart and two or more wheels on a second side of said cart with the wheels so spaced that some wheels will be within said C-channel while other sheels will be outside said C-channel;

a second support structure connected to said C-channel;

two additional blocks, each additional block containing an aperture with a center and having a first end and a second end and, between the first end of said additional block and the center of the aperture, being rotatably attached to said second support structure;

a second rod having a first end, a second end, and a length, having a portion of said second rod beginning near the first end of second said rod vary periodically in thickness along the length of said second rod with the maximum periodic thickness being less than the minimum diameter of the aperture in said additional blocks, and having the second end of said second rod connected to said wheeled cart, said additional blocks being located at such a distance from one another that the aperture in one of said additional blocks will be at one of the points of minimum thickness of said second rod when the aperture in the other of said additional blocks is at one of the points of maximum thickness of said second rod, said second rod being removably inserted into the apertures of said additional blocks;

a means for biasing said additional blocks;

a second lever arm slidably mounted on said second support structure and connected to said additional blocks near the second end of each of said additional blocks;

a second block actuator having a housing and a block actuator rod with a second end, said block actuator housing of said second block actuator being attached to said support structure with the second end of the block actuator rod of said second block actuator being connected to said lever arm;

a second extension actuator having a housing and an extension actuator rod with a second end, said extension actuator housing of said second extension actuator being attached to said C-channel and with the second end of the extension actuator rod of said second extension actuator being connected to said wheeled cart; and a shoulder bar connected to said wheeled cart.

24. A restraint, which comprises:

an outer sleeve having an open first end, having a second end, and having a first side containing an aperture;

an inner sleeve having a first end, a first wall containing and aperture, and a substantially open second end, said inner sleeve being slidably mounted within said outer sleeve;

a hydraulic lock connected to said outer sleeve, which hydraulic lock comprises:

a housing having a bore, having a first end containing an aperture, and having a second end;

a piston slidably mounted within the bore of said housing;

a tube having a first end attached to said housing of said hydraulic lock at or nearer the first end of said housing of said hydraulic lock than said piston will ever be and communicating with the bore of said housing of said hydraulic lock and also having a second end attached to said housing of said hydraulic lock at or nearer the second end of said housing of said hydraulic lock than said piston will ever be and communicating with the bore of said housing of said hydraulic lock; and a valve in said tube at a location intermediate between the first end and the second end of said tube;

a rod having a first end, a second end, and a length, said rod having a first end attached to said piston and;

a hinge attached to said inner sleeve near the first end of said inner sleeve;

a lap bar having a first end attached to said hinge and having a second end angled so that such second end is generally parallel to said rod;

an extension actuator having a housing and an extension actuator rod with a second end, said extension actuator housing being attached to said hinge with the second end of the extension actuator rod being attached to said outer sleeve;

a spring;

a plug biased by said spring to enter a cavity shaped to accommodate said plug within a first end of said lap bar;

a release actuator having a housing and a release actuator rod with a second end, said release actuator housing being attached to said hinge with the second end of the release actuator rod being attached to said plug so that said plug will be withdrawn from the cavity as the release actuator rod moves farther into the release actuator housing;

a plate having an aperture, said plate being rigidly attached to said housing of said hydraulic lock;

a slide spring;

a slide slidably mounted to a first wall of said inner sleeve, said first wall of said inner sleeve sliding adjacent to the first side of said outer sleeve and oriented such that said slide spring urges a first end of said slide toward the first side of said outer sleeve, the first side of said outer sleeve being constructed to have a portion of the first side of said outer sleeve beside said slide throughout the movement of said rod, with the aperture in the first wall of said inner sleeve, the aperture in the first side of said outer sleeve, and said slide being sized and positioned such that when the rod is at its maximum desired extension from said hydraulic lock, the aperture in the first wall of said inner sleeve, the aperture in the first side of said outer sleeve, and said slide are sufficiently aligned that a first end of said slide enters the aperture in the first wall of said inner sleeve and the aperture in the first side of said outer sleeve;

a cable attached to a portion of said lap bar that moves farther from said slide as said lap bar is rotated toward a desired angle, with respect to said rod, to retain a person, said cable having a second end connected to a second end of said slide; and a means for changing the direction of a force oriented such that as said lap bar is rotated toward the desired angle, said cable, with its length being selected such that said slide will remain in the aperture until said lap bar is rotated but not after said lap bar has been rotated, pulls said slide from the aperture in the first side of said outer sleeve, thereby permitting the rod to be pushed farther into said hydraulic lock.

25. The restraint as recited in claim 24, further comprising:

a C-channel;

a wheeled cart having two or more wheels on a first side of said cart and two or more wheels on a second side of said cart with the wheels so spaced that some wheels will be within said C-channel while other sheels will be outside said C-channel;

a second hydraulic lock connected to said C-channel, which second hydraulic lock comprises:

a housing having a bore, having a first end containing an aperture, and having a second end;

a piston slidably mounted within the bore of said housing of said second hydraulic lock;

a tube having a first end attached to said housing of said second hydraulic lock at or nearer the first end of said housing of said second hydraulic lock than said piston within the bore of said housing of said second hydraulic lock will ever be and communicating with the bore of said housing of said second hydraulic lock and also having a second end attached to said housing of said second hydraulic lock at or nearer the second end of said housing of said second hydraulic lock than said piston within the bore of said housing of said second hydraulic lock will ever be and communicating with the bore of said housing of said second hydraulic lock; and a valve in said tube of said second hydraulic lock, said valve in said tube of said second hydraulic lock being at a location intermediate between the first end and the second end of said tube of said second hydraulic lock;

a second rod having a first end, a second end, and a length, said second rod having a first end attached to said piston within the bore of said housing of said second hydraulic lock and having a second end connected to said wheeled cart;

a second extension actuator having a housing and an extension actuator rod with a second end, said extension actuator housing of said second extension actuator being attached to said C-channel and with the second end of the extension actuator rod of said second extension actuator being connected to said wheeled cart; and a shoulder bar connected to said wheeled cart.

* * * * *